(12) United States Patent
Coyner

(10) Patent No.: US 8,424,576 B1
(45) Date of Patent: Apr. 23, 2013

(54) LATHE/MITRE SAW SYSTEM

(76) Inventor: Wallace W. Coyner, Lakeland, FL (US)

(*) Notice: Subject to any disclaimer, the term of this patent is extended or adjusted under 35 U.S.C. 154(b) by 0 days.

(21) Appl. No.: 13/066,789

(22) Filed: Apr. 25, 2011

(51) Int. Cl.
*B27M 1/08* (2006.01)

(52) U.S. Cl.
USPC .......................... 144/3.1; 144/165; 144/286.5

(58) Field of Classification Search .................. 144/2.1, 144/3.1, 286.5, 165
See application file for complete search history.

(56) References Cited

U.S. PATENT DOCUMENTS

| | | | | |
|---|---|---|---|---|
| 4,349,945 A * | 9/1982 | Fox | ................................ | 29/27 A |
| 4,516,612 A * | 5/1985 | Wiley | ............................ | 144/1.1 |
| 4,830,069 A * | 5/1989 | Milyard | ...................... | 144/48.3 |
| 5,655,583 A * | 8/1997 | Heintzeman | ............... | 144/204.2 |
| 5,890,521 A * | 4/1999 | Dunn | ............................ | 144/1.1 |
| 6,698,476 B2 * | 3/2004 | Baculy | ........................ | 144/145.1 |
| 7,677,283 B2 * | 3/2010 | Hooker | ...................... | 144/286.5 |

* cited by examiner

*Primary Examiner* — Dana Ross
*Assistant Examiner* — Matthew G Katcoff

(57) ABSTRACT

A bar has interior and exterior ends. The bar has a projection depending from the interior end. The projection is adapted to be slidably supported between the ways. The assembly also includes a support positioned above the exterior end. The support includes a recess positioned above the bar. The support is adapted to receive and support a base of a mitre saw. A spacer is adapted to couple the support with respect to the bar.

1 Claim, 3 Drawing Sheets

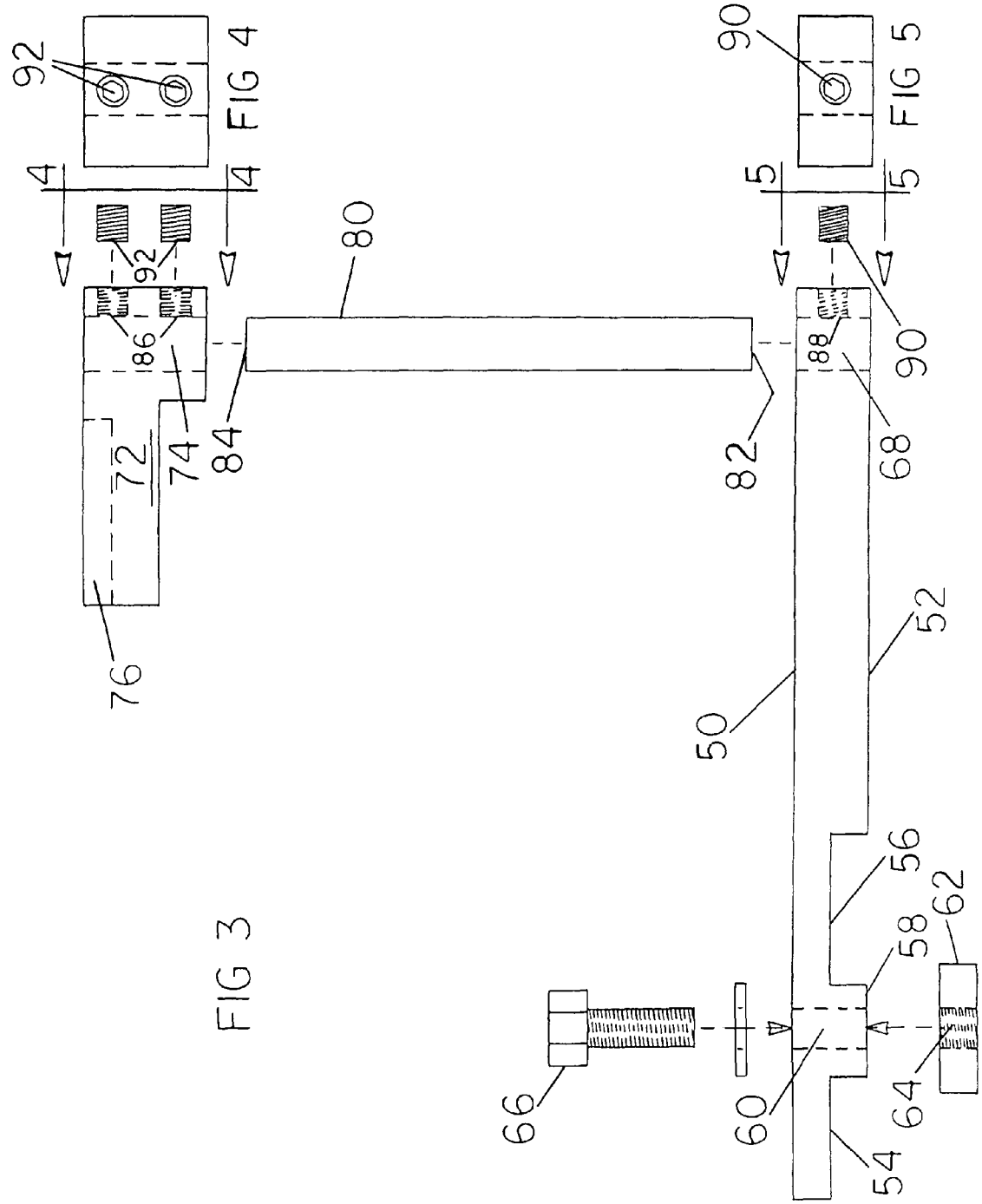

LATHE/MITRE SAW SYSTEM

BACKGROUND OF THE INVENTION

Field of the Invention

The present invention relates to a lathe/mitre saw system and more particularly pertains to making face cuts on irregularly shaped workpieces through the periodically rotating of the workpiece about its axis while oscillating a mitre saw blade into and out of contact with the workpiece, the oscillating being in the plane perpendicular to the axis of rotation of the workpiece, the rotating and oscillating and the making of the face cuts being done in a safe, convenient and economical manner.

SUMMARY OF THE INVENTION

No one has heretofore adapted a miter saw to a wood lathe for the purpose of safely removing irregular wood from a bowl blank, while this bowl blank is mounted on the face plate of the lathe. This adaptation quickly and safely removes the unwanted wood leaving a surface ready for finish sanding, saving both time and wood. The time required to prepare a bowl is reduced substantially with the use of this mitre saw assembly.

In the known designs and configurations now present in the prior art, the present invention provides an improved lathe/mitre saw system. As such, the general purpose of the present invention, which will be described subsequently in greater detail, is to provide a new and improved lathe/mitre saw system and method which has all the advantages of the prior art and none of the disadvantages.

The existing method of making face cuts to both the top and bottom of wooden turning pieces such as bowls is to make a cut to the work piece while it is rotating, powered by the lathe. The cut is made by a hand held a metal gouge, parting tool, or scraper supported by a tool rest, the base of which rests on the way of the lathe, and the sharp end of the hand held tool is contacted into the rotating work piece.

The existing cutting operation has the disadvantage of 1) potential personal injury to the wood worker if the hand held cutting tool catches in a defect in the work piece or contacts a foreign object (e.g. a nail or staple) in the work piece. 2) "Tear out" occurs in the wood from the work piece by the cutting tool, which requires lengthy and tedious sanding to make the work piece smooth and esthetically pleasing. 3) The existing cutting operation does not assure that consistent perpendicular cuts are made to the work piece.

The present invention provides a linkage of two existing machines, a powered lathe and a powered mitre saw, so that face cuts to the wooden work piece can made while the work piece is on the lathe.

To attain this, the present invention essentially comprises a lathe/mitre saw system. First provided is a lathe (provided by others). The lathe has an operational assembly. The operational assembly includes a motor. The operational assembly also includes a head stock. The lathe also has On/Off switches. The lathe has a spindle. The spindle is rotatable about a fixed horizontal primary axis. The spindle is adapted to rotatably support an irregularly shaped workpiece, such as a tree stump. The spindle is further adapted for rotating the workpiece about the primary axis. The lathe also includes two parallel ways. The ways have horizontal upper surfaces. The upper surfaces are in a common upper plane. The ways have horizontal lower surfaces. The lower surfaces are in a common lower plane. A slot is provided. The slot is provided between the ways.

A mitre saw is provided by others. The mitre saw has a base. The mitre saw has a drive motor. The mitre saw also has a pivot pin. In this manner the motor is rotatably coupled to the base. The pivot pin has a horizontal secondary axis. The secondary axis is provided parallel with the primary axis. The secondary axis is positioned perpendicular to the primary axis. The secondary axis is laterally offset from the primary axis but at an essentially common elevation. The mitre saw has a circular blade. The circular blade is coupled to the motor. The blade is adapted to rotate in an operational plane perpendicular to the primary and secondary axes. The blade is adapted to oscillate between an inoperative raised orientation and an operative lowered orientation. The blade is also adapted to face cut the workpiece when oscillating downwardly in contact with the workpiece. The blade is further adapted to allow the user to hand rotate the workpiece when the blade is oscillated upwardly and moved out of contact with the workpiece.

Provided next is a lathe/mitre saw assembly. The lathe/mitre saw assembly operatively couples the mitre saw and the lathe. The assembly includes a bar. The bar has an interior end. The bar has an exterior end. The bar has an upper face. The bar has a lower face. The bar has parallel notches. The notches are provided in the lower face adjacent to the interior end. The notches form a projection. The projection is formed between the notches. The bar has an unthreaded interior aperture. The aperture extends through the bar and centrally through the projection. The assembly includes a backing plate. The backing plate has a vertical threaded aperture. The aperture is axially aligned with the interior aperture. The assembly includes a bolt. In this manner the backing plate is coupled to the bar. The ways are received within the notches. The upper surfaces of the ways are provided in contact with the lower surface of the bar. The backing plate is provided in contact with the projection and the ways. The bar has an exterior aperture. The apertures is provided parallel with the interior aperture adjacent to the exterior end.

The assembly also includes a mitre saw support. The mitre saw support has an upper aperture. The upper aperture is located above and axially aligned with the exterior aperture. The support also includes a recess. The recess is positioned above the bar. In this manner the base of the mitre saw is received and supported.

Provided last is a spacer. The spacer is in a cylindrical configuration. The spacer has a lower end. The lower end is received within the exterior aperture. The spacer has an upper end. The upper end is received within the upper aperture. Set screw apertures are provided. The set screw apertures extend through the bar and the support adjacent to the exterior and upper apertures. Set screws are provided. The set screws fixedly secure the support and the bar with respect to the spacer. The spacer is adapted to hold the mitre saw in a position with respect to the lathe. In this manner the bolt is adapted to be loosened. Also in this manner the bar and mitre saw are slid toward and away from the lathe and the workpiece. Further in this manner the workpiece is adapted to be rotated prior to a cut.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lathe/mitre saw system which has all of the advantages of the prior art of making face cuts to the top and bottom of the work piece by using a hand held gouge, parting tool or scraper, of known designs and configurations and none of the disadvantages.

It is another object of the present invention to provide a new and improved lathe/mitre saw system which may be easily and efficiently manufactured and marketed.

It is further object of the present invention to provide a new and improved lathe/mitre saw system which is of durable and reliable constructions.

An even further object of the present invention is to provide a new and improved lathe/mitre saw system which is susceptible of a low cost of manufacture with regard to both materials and labor, and which accordingly is then susceptible of low prices of sale to the consuming public, thereby making such lathe/mitre saw system economically available to the buying public.

Even still another object of the present invention is to provide a lathe/mitre saw system for making face cuts on irregularly shaped workpieces through the periodically rotating of the workpiece about its axis while oscillating a mitre saw blade into and out of contact with the workpiece, the oscillating being in the plane perpendicular to the axis of rotation of the workpiece, the rotating and oscillating and the making of the face cuts being done in a safe, convenient and economical manner.

Lastly, it is an object of the present invention to provide a new and improved lathe/mitre saw system. A bar has interior and exterior ends. The bar has a projection depending from the interior end. The projection is adapted to be slidably supported between the ways. The assembly also includes a support positioned above the exterior end. The support includes a recess positioned above the bar. The support is adapted to receive and support a base of a mitre saw. A spacer is adapted to couple the support with respect to the bar.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an exploded front elevational view of the lathe/mitre saw assembly shown in FIG. 2.

FIGS. 4 and 5 are end elevational views of portions of the assembly taken along lines 4-4 and 5-5 of FIG. 3.

The same reference numerals refer to the same parts throughout the various Figures.

DESCRIPTION OF THE PREFERRED EMBODIMENT

Figure 1:
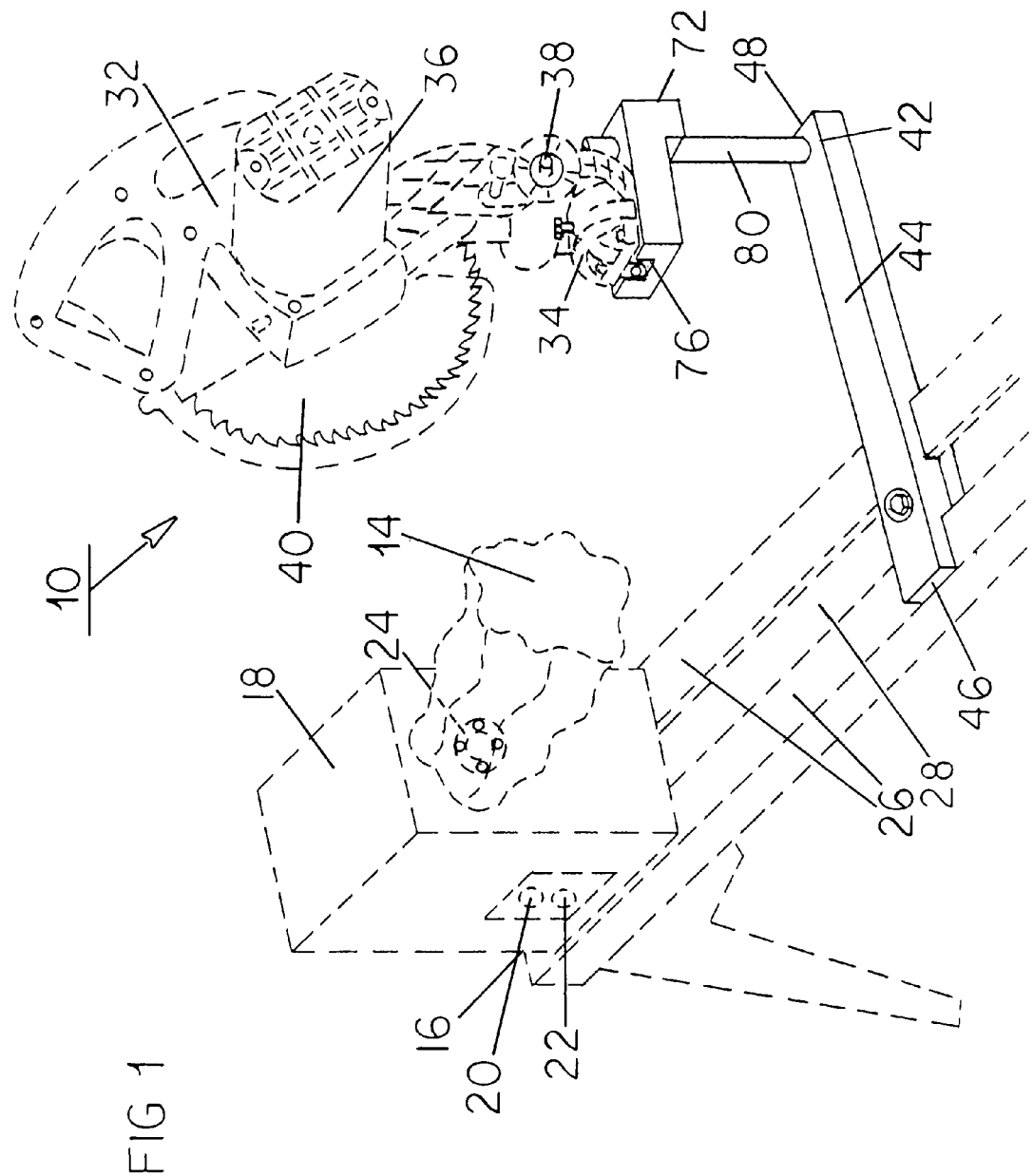
FIG. 1 is a lathe/mitre saw system constructed in accordance with the principles of the present invention.
Figure 2:
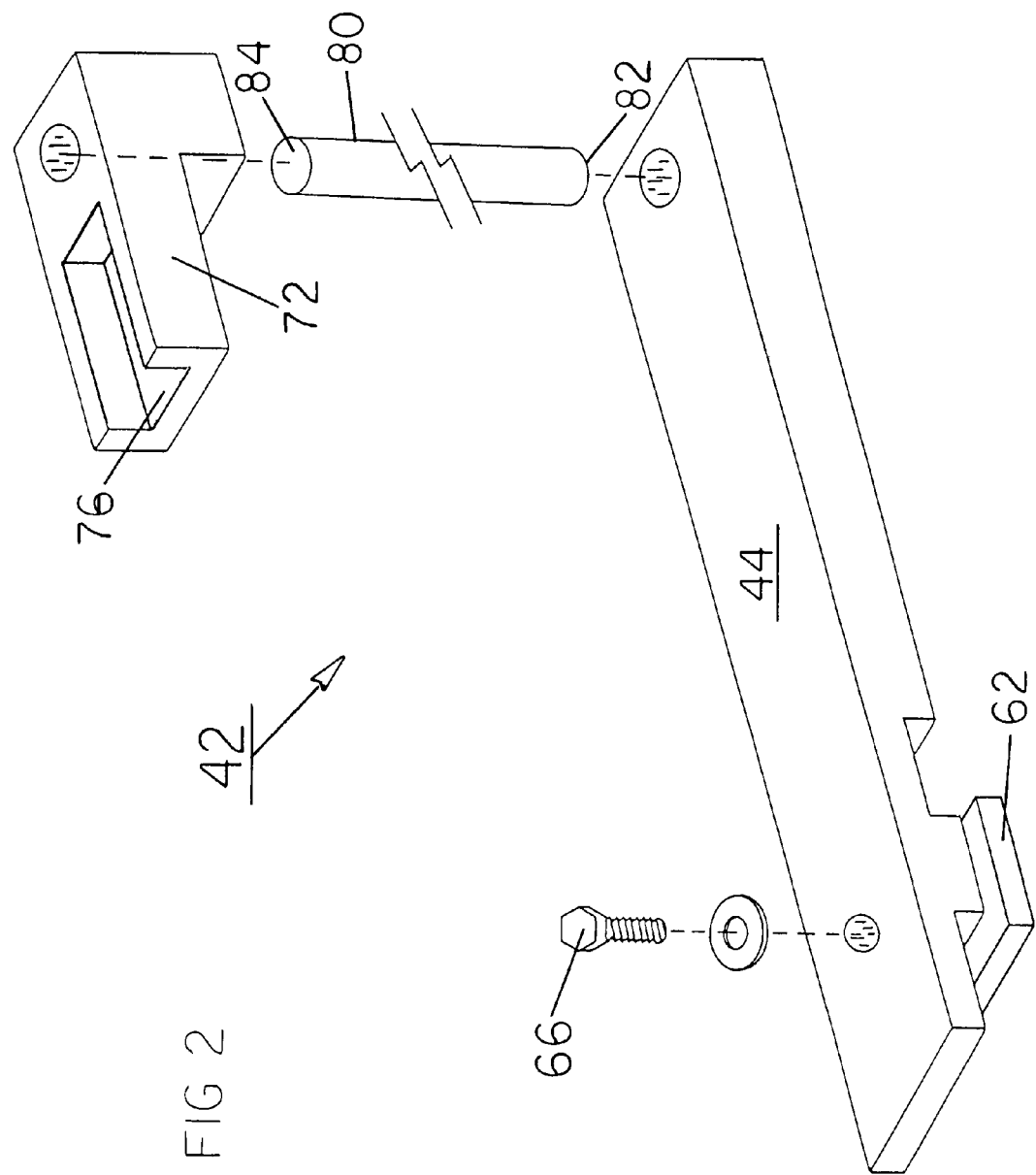
FIG. 2 is a lathe/mitre saw assembly for use in operatively coupling a mitre saw and a lathe as shown in FIG. 1.

With reference now to the drawings, and in particular to FIG. 1 thereof, the preferred embodiment of the new and improved lathe/mitre saw system embodying the principles and concepts of the present invention and generally designated by the reference numeral 10 will be described.

The present invention, the lathe/mitre saw system 10 is comprised of a plurality of components. Such components in their broadest context include a bar, an assembly and a spacer. Such components are individually configured and correlated with respect to each other so as to attain the desired objective.

First provided is a lathe 16. The lathe has an operational assembly 18. The operational assembly includes a motor. The operational assembly also includes a head stock. The lathe also has On/Off switches 20, 22. The lathe has a spindle 24. The spindle is rotatable about a fixed horizontal primary axis. The spindle is adapted to rotatably support an irregularly shaped workpiece, such as a tree stump. The spindle is further adapted for rotating the workpiece about the primary axis. The lathe also includes two parallel ways 26. The ways have horizontal upper surfaces. The upper surfaces are in a common upper plane. The ways have horizontal lower surfaces. The lower surfaces are in a common lower plane. A slot 28 is provided. The slot is provided between the ways.

A mitre saw 32 is provided. The mitre saw has a base 34. The mitre saw has a drive motor 36. The mitre saw also has a pivot pin 38. In this manner the motor is rotatably coupled to the base. The pivot pin has a horizontal secondary axis. The secondary axis is provided parallel with the primary axis. The secondary axis is fixedly positioned to the primary axis. The secondary axis is laterally offset from the primary axis but at an essentially common elevation. The mitre saw has a circular blade 40. The circular blade is coupled to the motor. The blade is adapted to rotate in an operational plane perpendicular to the primary and secondary axes. The blade is adapted to oscillate between an inoperative raised orientation and an operative lowered orientation. The blade is also adapted to face cut the workpiece when oscillating downwardly in contact with the workpiece. The blade is further adapted to allow the user to hand rotate the workpiece when the blade is oscillated upwardly and moved out of contact with the workpiece.

Provided next is a lathe/mitre saw assembly 42. The lathe/mitre saw assembly operatively couples the mitre saw and the lathe. The assembly includes a bar 44. The bar has an interior end 46. The bar has an exterior end 48. The bar has an upper face 50. The bar has a lower face 52. The bar has parallel notches 54, 56. The notches are provided in the lower face adjacent to the interior end. The notches form a projection 58. The projection formed between the notches. The bar has an unthreaded interior aperture 60. The aperture extends through the bar and centrally through the projection. The assembly includes a backing plate 62. The backing plate has a vertical threaded aperture 64. The aperture is axially aligned with the interior aperture. The assembly includes a bolt 66. In this manner the backing plate is coupled to the bar. The ways are received within the notches. The upper surfaces of the ways are provided in contact with the lower surface of the bar. The backing plate is provided in contact with the projection and the ways. The bar has an exterior aperture 68. The apertures is provided parallel with the interior aperture adjacent to the exterior end.

The assembly also includes a mitre saw support 72. The mitre saw support has an upper aperture 74. The upper aperture is located above and axially aligned with the exterior aperture. The support also includes a recess 76. The recess is positioned above the bar. In this manner the base of the mitre saw is received and supported.

Provided last is a spacer 80. The spacer is in a cylindrical configuration. The spacer has a lower end 82. The lower end is received within the exterior aperture. The spacer has an upper end 84. The upper end is received within the upper aperture. Set screw apertures 86, 88 are provided. The set screw apertures extend through the bar and the support adjacent to the exterior and upper apertures. Set screws 90, 92 are provided. The set screws fixedly secure the support and the bar with respect to the spacer. The spacer is adapted to hold the mitre saw in a position with respect to the lathe. In this manner the bolt is adapted to be loosened. Also in this manner the bar and mitre saw are slid toward and away from the lathe and the workpiece. Further in this manner the workpiece is adapted to be rotated prior to a cut.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A lathe/mitre saw system (10) for making face cuts on irregularly shaped workpieces (14) through the periodically rotating of the workpiece about its axis while oscillating a mitre saw blade into and out of contact with the workpiece, the oscillating being in the plane perpendicular to the axis of rotation of the workpiece, the rotating and oscillating and the making of the face cuts being done in a safe, convenient and economical manner, the system comprising, in combination:

a lathe (16) having an operational assembly (18) with a motor and a head stock box, the lathe also having On/Off switches (20), (22) and a spindle (24), the spindle being rotatable about a fixed horizontal primary axis, the spindle adapted to rotatably support an irregularly shaped workpiece and for rotating the workpiece about the primary axis, the lathe also including two parallel ways (26), the ways having horizontal upper surfaces in a common upper plane and horizontal lower surfaces in a common lower plane and with a slot (28) between the ways;

a mitre saw (32), the mitre saw having a base (34) and a drive motor (36), the mitre saw also having a pivot pin (38) rotatably coupling the motor with respect to the base, the pivot pin having a horizontal secondary axis parallel with and fixedly positioned with respect to the primary axis, the secondary axis being laterally offset from the primary axis but at an essentially common elevation, the mitre saw having a circular blade (40) coupled to the motor, the blade adapted to rotate in an operational plane perpendicular to the primary and secondary axes, the blade adapted to oscillate between an inoperative raised orientation and an operative lowered orientation, the blade adapted to face cut the workpiece when oscillating downwardly in contact with the workpiece, the blade adapted to allow the user to hand rotate the workpiece when the blade is oscillated upwardly and moved out of contact with the workpiece; and a lathe/mitre saw assembly (42) operatively coupling the mitre saw and the lathe, the assembly including a bar (44) having an interior end (46) and an exterior end (48), the bar having an upper face (50) and a lower face (52), the bar being formed with parallel notches (54), (56) in the lower face adjacent to the interior end, the notches forming a projection (58) between the notches, an unthreaded interior aperture (60) extending through the bar and centrally through the projection, a backing plate (62) having a vertical threaded aperture (64) axially aligned with the interior aperture, a bolt (66) coupling the backing plate to the bar, the ways being received within the notches with their upper surfaces of the ways in contact with the lower surface of the bar and with the backing plate in contact with the projection and the ways, the bar having an exterior aperture (68) parallel with the interior aperture adjacent to the exterior end;

the assembly also including a mitre saw support (72) with an upper aperture (74) located above and axially aligned with the exterior aperture, the support also including a recess (76) positioned above the bar for receiving and supporting the base of the mitre saw; and a spacer (80) in a cylindrical configuration with a lower end (82) received within the exterior aperture and an upper end (84) received within the upper aperture, set screw apertures (86),(88) extending through the bar and the support adjacent to the exterior and upper apertures with set screws (90),(92) fixedly securing the support and the bar with respect to the spacer, the spacer adapted to hold the mitre saw in a position with respect to the lathe whereby the bolt is adapted to be loosened for sliding the bar and mitre saw toward and away from the lathe and the workpiece and whereby the workpiece is adapted to be rotated prior to a cut.

* * * * *